United States Patent [19]

Koch

[11] Patent Number: 5,421,052
[45] Date of Patent: Jun. 6, 1995

[54] TRANSITION PROTECTOR FOR A TELESCOPIC GANGWAY

[75] Inventor: Robert Koch, Bad Sooden-Allendorf, Germany

[73] Assignee: Hubner Gummi-und Kunststoff GmbH, Germany

[21] Appl. No.: 264,024

[22] Filed: Jun. 22, 1994

[30] Foreign Application Priority Data

Jun. 24, 1993 [DE] Germany ............... 93 09 412.4

[51] Int. Cl.$^6$ ............................................. B65G 11/00
[52] U.S. Cl. ................................... 14/69.5; 14/71.5
[58] Field of Search ............... 14/69.5, 71.1, 71.3, 14/71.5, 71.7; 52/173.1, 173.2

[56] References Cited

U.S. PATENT DOCUMENTS 3,699,600 10/1972 Eacs et al. ................... 14/71.5
4,333,195 6/1982 Lichti ........................ 14/71.5
4,712,339 12/1987 Wenham et al. ............... 14/71.5

*Primary Examiner*—Michael Powell Buiz
*Attorney, Agent, or Firm*—Levine & Mandelbaum

[57] ABSTRACT

A transition protector for telescopic gangways with a bellows having one end fixed to a rigid passageway and another end which can be brought to a door opening in the fuselage wall of an aircraft, and which surrounds the telescopic gangway in the manner of a tunnel or tube between its two ends. The front end of the bellows, which can be brought to the fuselage by changing the extension of the bellows, is surrounded by a rigid frame which is attached to the bellows and carries a large, detachably connected strip-shaped bumper, which can be elastomerically deformed on its front side facing the fuselage.

14 Claims, 2 Drawing Sheets

5,421,052

TRANSITION PROTECTOR FOR A TELESCOPIC GANGWAY

BACKGROUND OF THE INVENTION

Telescopic gangways have been known to be designed such that airplane passengers can move from a passenger ramp into the airplane or conversely, from the airplane to the passenger ramp, without being exposed to environmental factors. It has also been known that bellows, which arch over the telescopic gangway in the manner of a tunnel, are used for this purpose. If desired, the tunnel may be a tube closed all around. The bellows are fixed with one of their ends, the inner end, in relation to the passenger ramp. The length of the bellows can be changed to the extent that the bellows can be brought closer to the fuselage with their front or outer end until they come into contact with the fuselage, surrounding a door in the fuselage. The length of the bellows is inherently correspondingly long in the functional position. When not in use, it can be collapsed, surrounding an opening leading to the passenger ramp, and be in contact with a wall of the passenger ramp. To make it possible to bring the front end of a bellows as close to the fuselage as possible, in the case of different airplane contours, with an inexpensive contouring device, the front side of the bellows is provided, at its outer or front end, with a circular strip made of a pressure-elastic material, i.e., a bumper.

The bumper is subject to considerable wear even if great care is taken, so that a worn bumper must be replaced with a new one after a relatively short operating time. Such wear is avoidable only to a very limited extent.

The task of the present invention is, consequently, to design the front end of a bellows that can be used as a transition protection for a telescopic gangway so that a gap-free contact between the bellows and the fuselage can be achieved while minimizing unavoidable wear, and providing for replacement of a worn bumper with a new bumper in little time, with few tools, and with little enough work so that replacement can be achieved even on a taxiway.

This task is accomplished by a transition protection according to the claims.

SUMMARY OF THE INVENTION

The bumper used in this transition protection has an elasticity which makes it possible to bring the front end of the bellows into contact with fuselages of various contours over a broad range, even though it is mounted on an extensively rigid frame, which contributes to the circumference of the bellows extensively maintaining its dimension to guarantee the unobstructed passage of airplane passengers through the telescopic gangway. The film surrounding the bumper in another variant of the present invention makes it possible to use a bumper material which is highly elastic and need not, itself, be abrasion-resistant, which can be designed to have the required elasticity, and which is able to provide regions of different elasticities, so that it is possible to obtain a bumper which has the necessary intrinsic rigidity, on the one hand, and the desired elasticity, on the other hand. Should the bumper be worn despite these advantages, it can easily and simply be removed and replaced by a new bumper due to an easily detachable connection according to the present invention. Different forms of the film make it possible, if necessary, to sufficiently, and possibly optimally, screen the detachable connection from external influences. Even though the design of the detachable connection as a Velcro fastener is known per se, it represents in this connection an especially simple design of the connection means, which is reliable in operation and is therefore particularly suitable.

The present invention is embodied in a particularly advantageous manner by the additional features according to the claims.

DESCRIPTION OF THE DRAWINGS

The present invention will be explained in greater detail below on the basis of the drawing. In the drawing.

DESCRIPTION OF THE PREFERRED EMBODIMENTS

Figure 1:
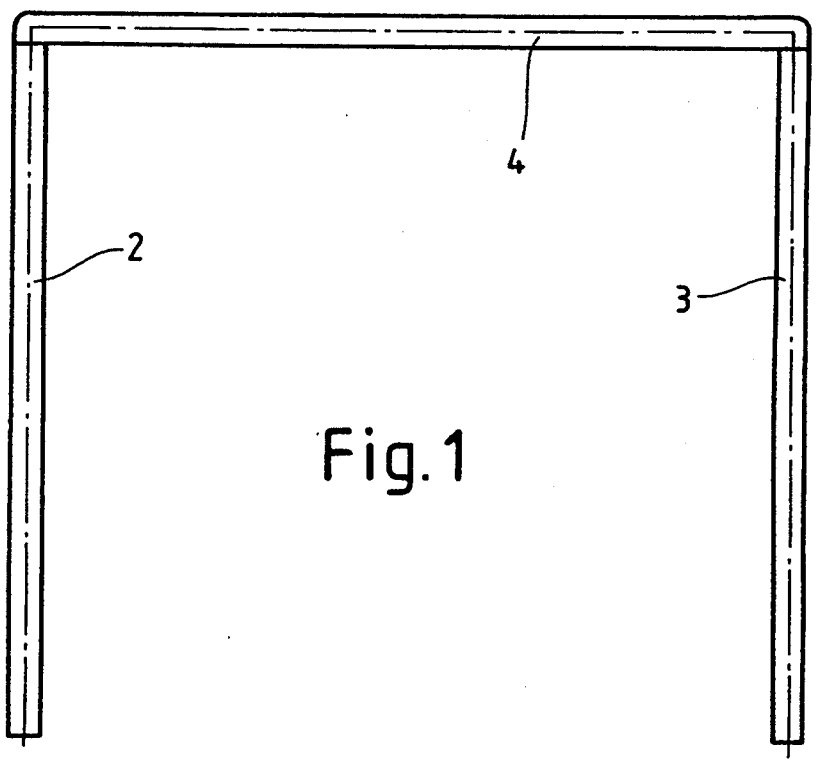
FIG. 1 is a view of an environment for the application of the present invention.
Figure 4:
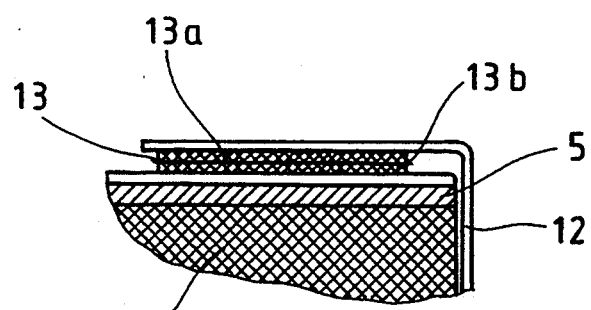
FIG. 4 is an enlarged view of area X in FIG. 2.
Figure 5:
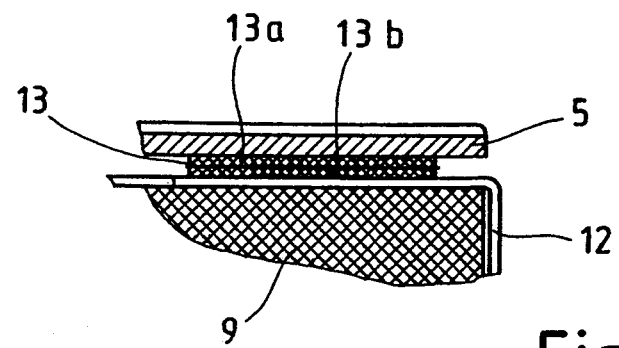
FIG. 5 is an enlarged view of area X in FIG. 3.

A bellows 1 with two side walls 2, 3 and a roof 4, which connects the side walls at their top ends, forms a tunnel at the lower end of which a telescopic gangway, not shown, is located. At the inner or rear end of the bellows 1 and over its entire circumference, a passage opening, through which the telescopic gangway can be entered and exited, is fastened, all around, to a wall of a passenger ramp or the like. This characteristic will not be discussed in detail, because it is known.

At its outer or front end, the bellows 1 is fastened to an end frame 5, which is a spring steel plate. The bellows 1 is connected to the end frame 5 by rivets 6, which are distributed at least approximately uniformly over the entire circumferences of the bellows and the end frame, and are preferably rubber plugs, one head of which lies on the outside of the bellows over a strip 7, and the other head of which lies on the outside of the end frame 5. The respective shafts of the plugs pass through openings in the strip 7, in the bellows 1 and in the end frame 5. The bellows may consist, in known manner, of rubberized fabric which forms individual strips, which are held together by intermediate frames 8. The technique is a prior-art technique in this respect as well, and therefore it will not be explained in greater detail.

An all-round bumper 9 made of a pressure-elastic material is coordinated with the outer end of the bellows in the two disclosed preferred embodiments. The bumper comprises a relatively harder layer 10 of a relatively smaller thickness, which is located closer to the bellows, and a relatively softer layer 11 of a relatively greater thickness, which is located farther away from the bellows. The bumper 9 is surrounded in its entirety by a film 12, which is relatively abrasion-resistant and interferes with movements within the bumper 9 to the lowest extent possible. A Velcro fastener 13 is arranged as a simple, easy-to-open, connector between the bumper 9 and the end frame 5.

Figure 3:
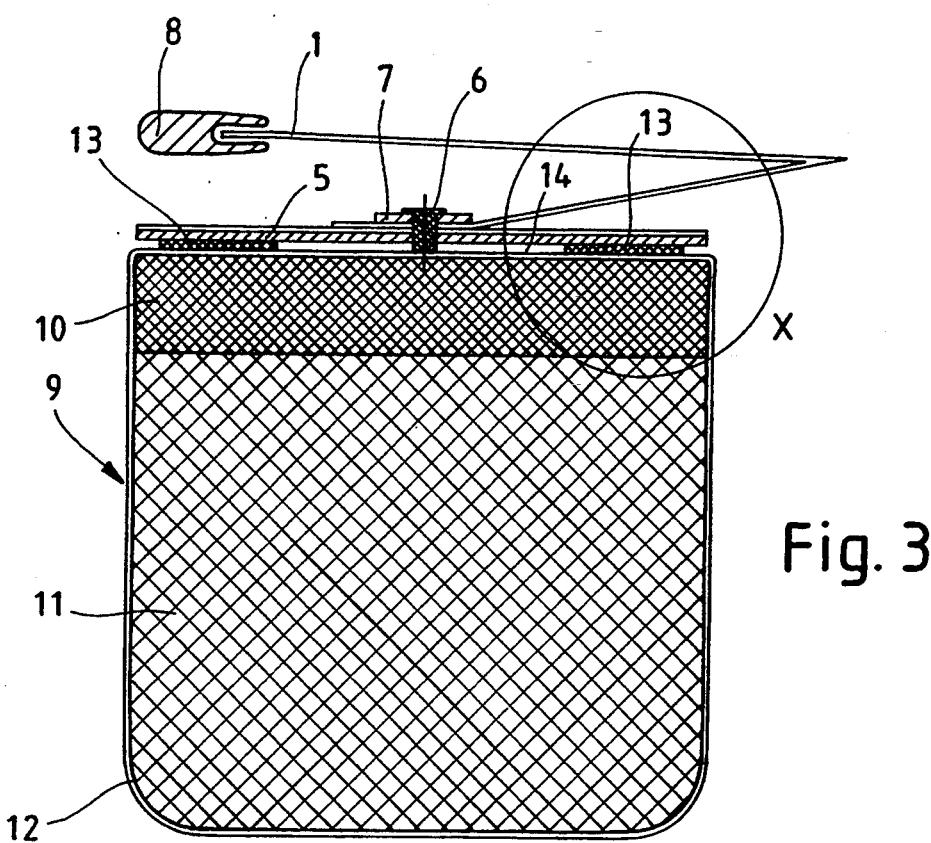

In the embodiment of FIG. 3, one of the two cooperating partial strips 13a of the strip-shaped Velcro fastener 13 is attached to the end frame 5, and the other partial strip 13b is attached to the bumper 9 via the enveloping film 12.

Figure 2:
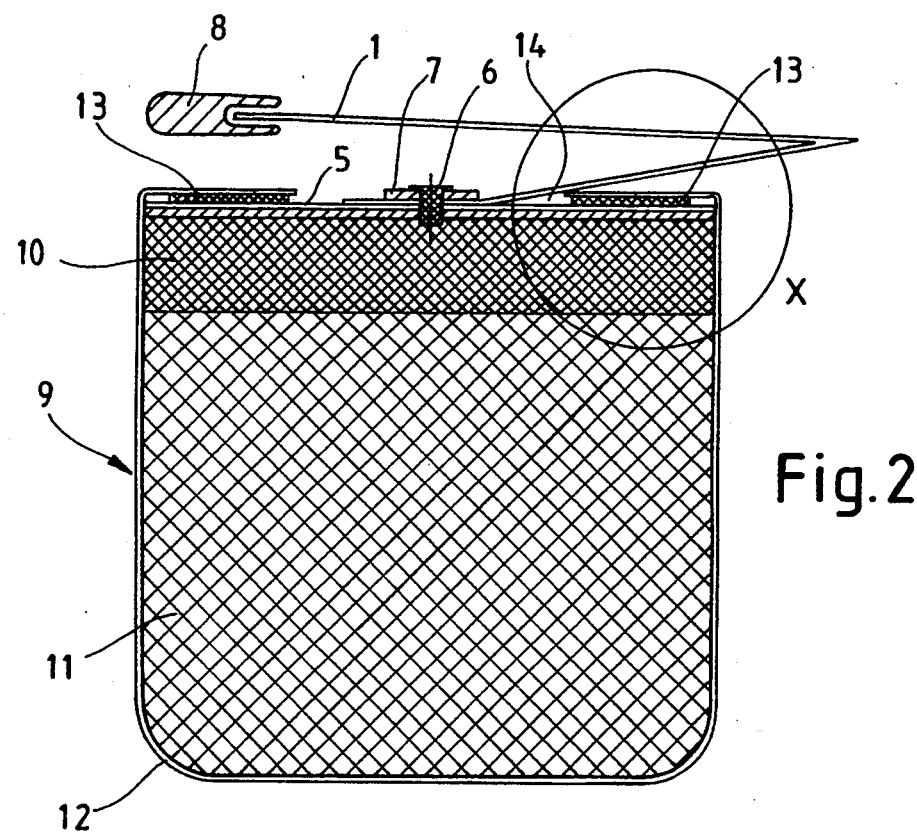
FIG. 2 and FIG. 3 are views showing two different, preferred embodiments according to the present invention as sectional views through the bumper in coordination with the bellows

In the embodiment according to FIG. 2, one of the partial strips of the Velcro fastener 13b is attached to the end frame 5, and the other partial strip 13a is attached to the inner side of the film 12, which consequently protects the fastener from environmental effects. The connection between each respective partial strip 13a, 13b of the Velcro fastener 13 and its respective component is performed by, e.g., bonding.

In both cases, two Velcro fastener strips 13 are attached to the side of the bumper proximate the bellows near its outer ends, and the Velcro fasteners are only wide enough to leave open, between them a channel 14 into which the fastener 6 extends.

What is claimed is:

1. In a bellows having a first end affixed to a rigid passageway and a second end movable to the entranceway in the fuselage of an aircraft surrounding a door opening in the fuselage wall, said bellows surrounding a telescopic gangway in the form of a tunnel or tube between its two ends, the improvement comprising a transition protector having a circumferential rigid frame mounted on said second end of said bellows, and elastomeric deformable bumper means mounted on said frame for engaging said fuselage.

2. A transition protector in accordance with claim 1 wherein the frame circumscribes substantially the entire circumference of the second end of the bellows and the bumper means circumscribes substantially the entire circumference of the frame.

3. A transition protector in accordance with claim 2, wherein the bumper means comprises a first and a second layer, the elasticity of said first layer being different from the elasticity of said second layer.

4. A transition protector in accordance with claim 3, wherein the layer proximate said frame is less elastic than the layer proximate said fuselage when said bellows second end is moved to the entranceway thereof.

5. A transition protector in accordance with claim 1 further comprising a film surrounding said bumper means.

6. A transition protector in accordance claim 5 wherein the frame comprises a spring steel plate riveted to the last fold of the bellows.

7. A transition protector in accordance with claim 6 wherein a portion of the film is disposed between the frame and the bumper means.

8. A transition protector in accordance with claim 6 wherein the film at least partially circumscribes the frame and the bumper means.

9. A transition protector in accordance with claim 7, further comprising detachable connection means having a first member mounted on one of the bumper means and the film and a second member mounted on the frame.

10. A transition protector in accordance with claim 9, wherein the detachable connection means is between the frame and the film.

11. A transition protector in accordance with claim 10, wherein the film is between the bumper means and the detachable connection means.

12. A transition protector in accordance with claim 9, wherein the detachable connection means comprises a Velcro fastener.

13. A transition protector in accordance with claim 12, wherein the Velcro fastener comprises two Velcro strip pairs extending parallel to one another and mounted on the side of the bumper means facing the bellows, and defining between them a channel and further comprising fastening means disposed in said channel for fastening the frame to the bellows.

14. A transition protector in accordance with claim 13 wherein the fastening means for fastening the frame to the bellows comprises a rubber plug.

* * * * *